United States Patent [19]

Stoyer

[11] 4,042,494
[45] Aug. 16, 1977

[54] PRESSURE PIPE TREATMENT FOR SEWAGE

[75] Inventor: Ray L. Stoyer, Irvine, Calif.

[73] Assignee: Irvine Ranch Water District, Irvine, Calif.

[21] Appl. No.: 421,421

[22] Filed: Dec. 3, 1973

Related U.S. Application Data

[63] Continuation-in-part of Ser. No. 151,096, June 8, 1971, abandoned.

[51] Int. Cl.² .............................................. C02C 1/08
[52] U.S. Cl. .......................................... 210/7; 210/9; 210/11; 210/16; 210/170; 210/195 S
[58] Field of Search ...................... 210/11, 15, 16, 18, 210/170, 199, 7, 9, 195 S, 194

[56] References Cited

U.S. PATENT DOCUMENTS

| | | | |
|---|---|---|---|
| 1,963,354 | 6/1934 | Currie | 210/199 X |
| 3,211,167 | 10/1965 | Clift et al. | 210/170 X |
| 3,335,082 | 8/1967 | Ullrich | 210/18 X |
| 3,525,685 | 8/1970 | Edwards | 210/170 X |
| 3,607,735 | 9/1971 | Hover et al. | 210/170 X |
| 3,730,884 | 5/1973 | Burns et al. | 210/170 X |

FOREIGN PATENT DOCUMENTS 307,587  3/1929  United Kingdom ................... 210/11

*Primary Examiner*—Thomas G. Wyse
*Attorney, Agent, or Firm*—Christie, Parker & Hale

[57] ABSTRACT

A sewage treatment simultaneously treats raw sewage and transports the effluent to a location where the treated effluent can be economically reused. The system converts raw sewage to primary effluent, and the solids in the primary effluent are transported to an aerobic sludge activator which converts the solids to activated sludge. The remaining primary effluent is mixed with the activated sludge and pumped up a pressure pipe treatment line which is preferably an upwardly inclined conduit at least 1000 feet long. Air or oxygen is injected into the treatment line downstream of the pump so that oxygen is dissolved at a relatively high pressure and in a sufficient amount to meet the biological oxygen demand (BOD) of the organic matter in the sewage. By the time the sewage reaches the outlet end of the line it contains substantially completely treated water and activated sludge.

Trunk sewers collect raw sewage and transport it by gravity to a headworks facility. Some of the waste water in the raw sewage is intercepted in the trunk sewer system, and is pumped into the pressure pipe treatment line. The remaining portion of the solids and waste water in the trunk sewer system are sent to the headworks. This reduces considerably the required hydraulic capacity of the trunk sewers, the primary treatment facility, and the pressure pipe treatment line, and eliminates almost completely the conventional secondary treatment facility. Activated sludge is removed from the pressure pipe treatment line and returned through the trunk sewers to the downstream sewage treatment facility to insure an adequate supply of activated sludge for continued treatment and for meeting the varying conditions in the raw sewage.

After substantial reduction of the sewage BOD, the treated sewage or effluent is maintained under anaerobic conditions to encourage bacteria to denitrify the effluent.

17 Claims, 5 Drawing Figures

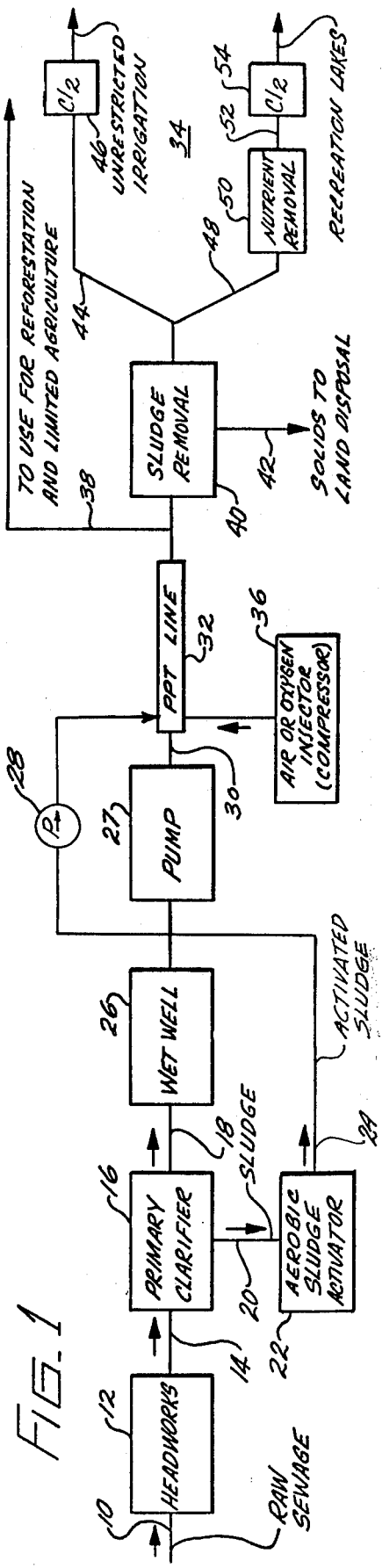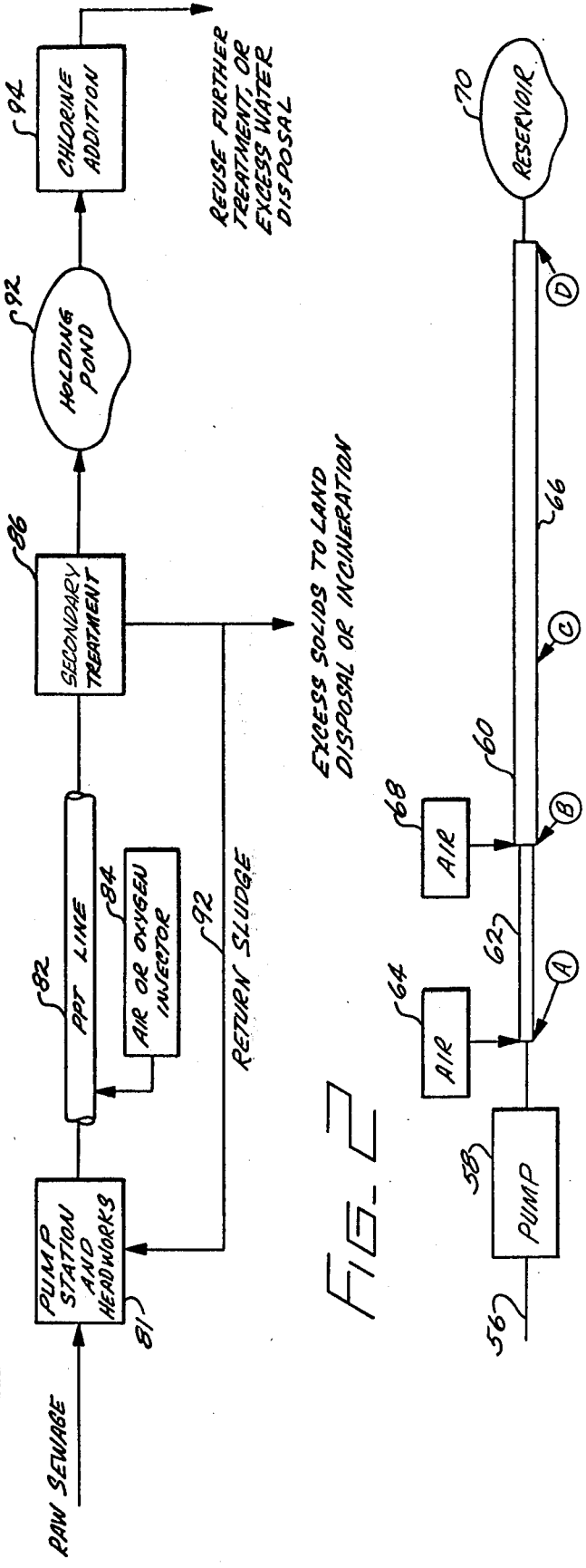

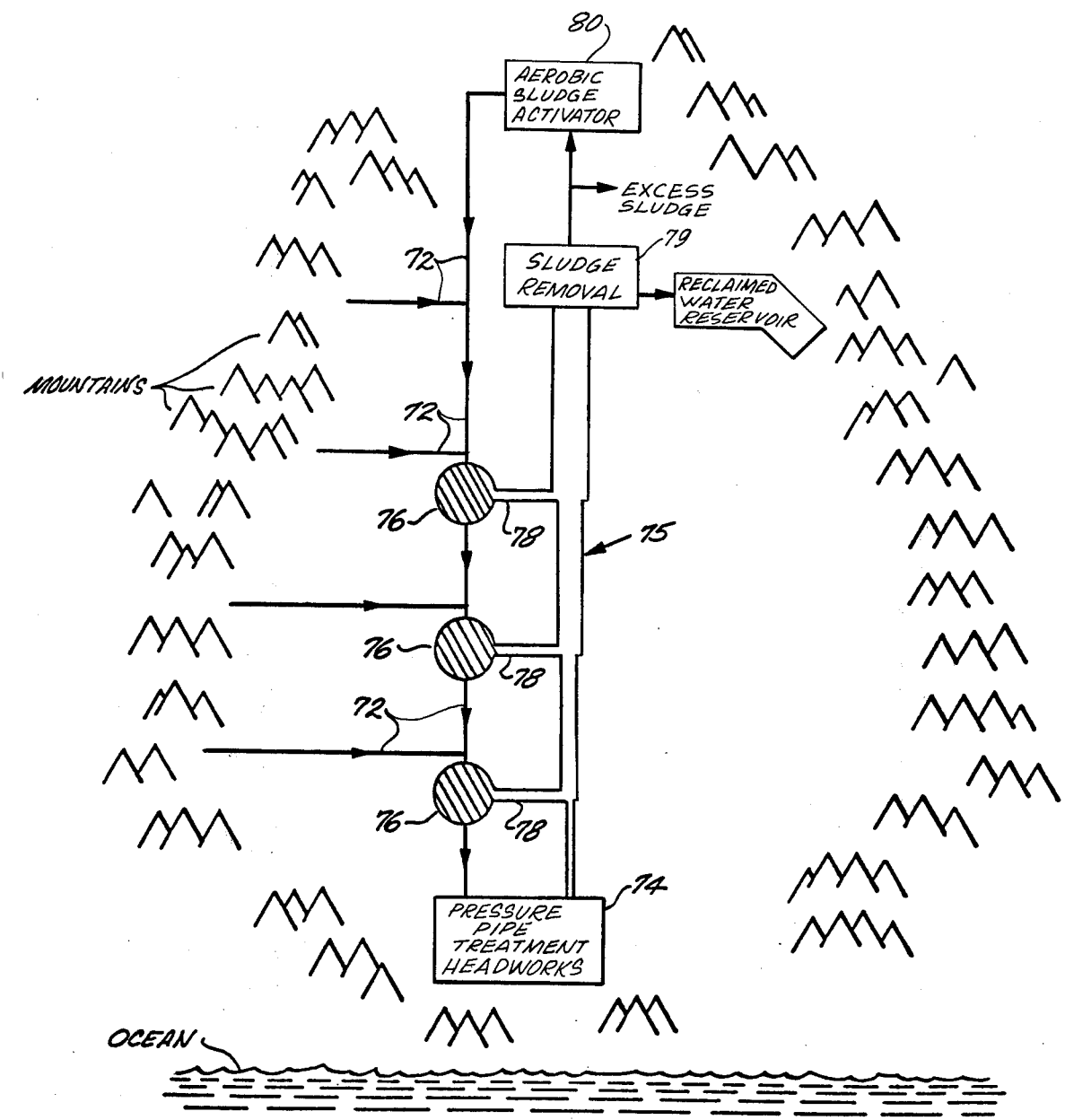
FIG_3

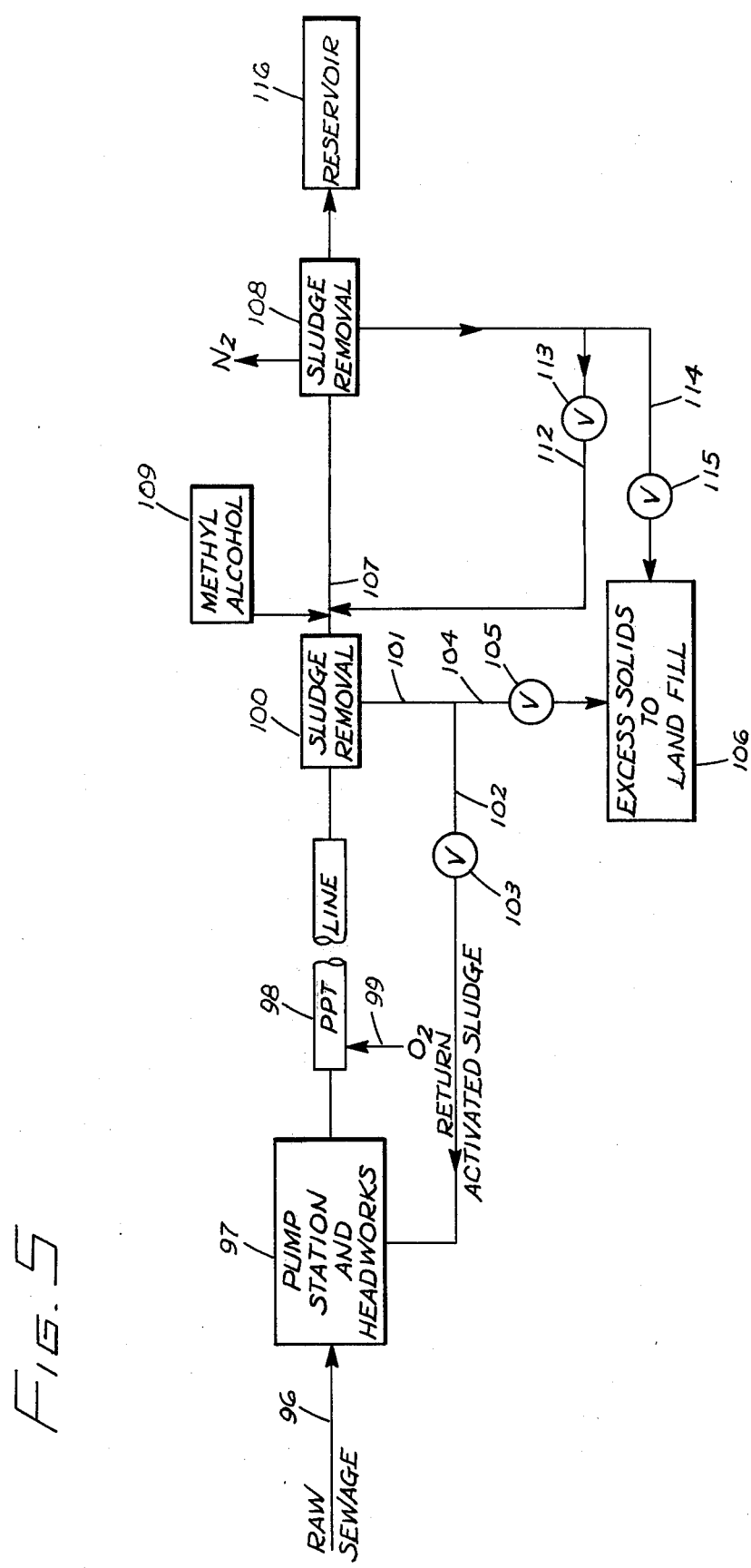

PRESSURE PIPE TREATMENT FOR SEWAGE

BACKGROUND OF THE INVENTION

This invention relates to sewage treatment, and more particularly to a system which includes a pressurized line for treating and transporting sewage, and is a continuation-in-part of my copending patent application Ser. No. 151,096, filed June 8, 1971, now abandoned.

The conventional systems for sewage treatment generally transport the waste water, which includes raw sewage, in a system of trunk sewers to a sewage treatment plant located at a downstream point in the area served by the system. The conventional sewage treatment plant includes a primary sludge separation facility for removing coarse solids from the sewage. Effluent from the primary separator is delivered to secondary treatment facilities which generally include aeration and flocculation settling tanks where the effluent is treated by biological oxidation by means of organisms which use oxygen from air and organic nutrients from the raw sewage to produce activated sludge and a clear final effluent having a low biological oxygen demand and low solids content.

Generally, at least a portion of the activated sludge is continuously returned to the aeration and sedimentation tanks to sustain the biological activity. In some cases, the final effluent is discharged through outfalls to large bodies of water such as a nearby ocean, estuary, stream, river, or lake. However, it is more economical to reuse at least a portion of the final effluent by delivering it upstream, such as by pumping it uphill through pressure pipe lines, so it may then move down through the service area for secondary uses such as irrigation.

Thus, in conventional sewage treatment systems a first cost is incurred to provide the treatment necessary to make the waste water suitable for reuse, and a second cost is involved in transporting the reclaimed water to the area in which it will be reused.

SUMMARY OF THE INVENTION

This invention provides a waste water treatment system which simultaneously treats the waste water and transports the effluent to an elevated location where the treated effluent can be economically reused. The system includes a relatively simple and inexpensive pressure pipe treatment line in which sewage is concurrently treated and delivered to the area where it will be reused. Thus, the cost of treating and reclaiming waste water is reduced substantially because separate costs of treatment and transportation are avoided. Moreover, the system eliminates a major portion of conventional sewage treatment plant construction costs, because the need for conventional secondary treatment facilities is eliminated, and the need for conventional outfall facilities also is reduced or eliminated.

Briefly, the sewage collection system drains raw waste material or sewage by gravity into the inlet end of an elongated pressure pipe treatment line. A pump delivers the collected sewage at a sufficiently high pressure area at the inlet end to force the waste material toward the outlet end of the line. Oxygen or air is injected under pressure into the high pressure area of the line to satisfy the biological oxygen demand of the raw waste material and produce substantially completed treated waste material at the outlet end of the line. The treated waste material is withdrawn from the outlet end for secondary uses such as irrigation.

In the preferred form of the invention, a portion of the raw waste material is converted to activated sludge which is continuously mixed with the remaining portion of the raw waste pumped into the pressure pipe treatment line.

In conventional sewage treatment systems, a system of trunk sewer lines delivers raw sewage to a sewage treatment plant for primary and secondary treatment. In one form of the present sewage treatment system, the same system of trunk sewers are adapted to deliver raw sewage to the inlet end of the pressure pipe treatment line, which preferably is inclined upwardly toward its outlet end. A substantial portion of the liquid in the raw waste material is intercepted at upper elevations in the trunk sewer system and pumped directly into the pressure pipe treatment line, preferably through lateral lines at longitudinally spaced locations. This reduces substantially the required capacity of the pressure pipe treatment line at elevations below where the lateral lines meet the pressure pipe treatment line. Solids and the remaining liquid in the raw waste material are delivered by the trunk sewers to the lower end of the pressure pipe treatment line for treatment. Because the major portion of the liquid in the raw waste material is intercepted at upper elevations, the required capacity of the trunk sewers at lower elevations is reduced considerably. Moreover, the hydraulic capacity of the activated sludge producing facility and the pumps at the lower end of the pressure pipe treatment line is also reduced substantially below the capacity required for conventional sewage treatment plants.

If the effluent treated becomes nitrified beyond permissible limits, the invention includes maintaining the treated effluent under anaerobic conditions in the presence of bacteria which consume oxygen and release nitrogen from the nitrified material.

BRIEF DESCRIPTION OF THE DRAWINGS

These and other aspects of the invention will be more fully understood from the following detailed description and the accompanying drawings, in which:

FIG. 1 is a schematic flow diagram showing a sewage treatment system which includes a pressure pipe treatment line;

FIG. 2 shows a schematic flow diagram of an experimental sewage treatment system which includes a pressure pipe treatment line;

FIG. 3 is a schematic flow diagram showing means for intercepting sewage upstream and delivering it directly to the pressure pipe treatment line;

FIG. 4 is a schematic flow diagram of an alternative form of the system shown in FIG. 1; and FIG. 5 is a schematic flow diagram of the invention used to denitrify treated sewage.

DETAILED DESCRIPTION OF THE PREFERRED EMBODIMENTS

Referring to FIG. 1, raw sewage flows through a line 10 to a conventional influent headworks 12 where the sewage passes through a comminuter (not shown) to shred large objects. Conventional grit removal is used to settle out most of the grit and sand contained in the sewage.

Sewage from the headworks passes through a line 14 to a conventional primary sludge separation facility or primary clarifier 16 which can include sedimentation tanks (not shown), mechanical solids separation equipment such as a screen (not shown), and the like. Other types of sludge separators can also be used. Clarified sewage or primary effluent, i.e., waste water containing a low amount of solid matter, passes from the upper portion of the primary clarifier through a line 18. Settled raw sludge or solids are withdrawn from a sludge sump (not shown) in the bottom of the primary clarifier through a line 20.

Raw sludge passing through line 20 is delivered to an aerobic sludge activator 22 which converts the solids to activated sludge. The aerobic sludge activator preferably comprises aeration tanks in which the solids in the sludge are biologically oxidized or changed by aerobic bacteria to produce solids known as activated sludge. Sufficient oxygen is introduced into the aerobic sludge activator to produce maximum activation of the sludge.

Aerobic sludge activator 22 is similar to that of an aerobic digester, except that much shorter detention times can be used because maximum activation of the sludge is the objective rather than complete digestion.

Activated sludge is withdrawn from the aerobic sludge activator through a line 24. The rate of withdrawal of the activated sludge matches the rate at which raw sludge is introduced from primary clarifier 16.

A wet well 26 receives primary effluent through line 18. A water-type pump 27 delivers primary effluent from the wet well through a line 30 to the inlet end of an elongated waste transportation and treatment conduit or pressure pipe treatment line 32, to be described in detail below, which extends toward an area of reuse. A solids-type pump 28 in line 24 delivers a slurry of activated sludge from line 24 into the inlet of the pressure pipe treatment line. Preferably, the pumps 27 and 28 operate at 4 to 10 times atmospheric pressure to force the mixture of primary effluent and activated sludge through the pressure pipe treatment line. Preferably, the pressure pipe treatment line is inclined upwardly toward the area of reuse. However, the pipeline also can be horizontal, or even inclined downwardly, in which cases the friction drop or a restriction (not shown) in the line provides the required pressure drop of at least several atmospheres.

An air compressor or pure oxygen supply 36 provides a source of oxygen, which is injected into the pressure pipe treatment line 32 on the discharge side of the pump so that oxygen is dissolved at a relatively high pressure in the mixture of activated sludge and primary effluent. Aerobic bacteria introduced into the treatment line with the activated sludge use the oxygen to remove the biological oxygen demand caused by the organic matter in the primary effluent.

Pressure pipe treatment line 32 is constructed the same as it would be if it were designed solely for the purpose of transporting water from one area to another area, except that its capacity is adjusted to accommodate the addition of air from air compressor 36. The length of the pressure pipe treatment line is at least about 1,000 feet, and preferably longer than 2,000 feet to assure substantially full treatment. Pressure pipe treatment lines longer than 1,000 feet present opportunities for accomplishing additional treatment, such as nitrogen removal, if desired. By the time activated sludge and the primary effluent reach the end of pressure pipe treatment line 32, the waste water is virtually completedly treated.

The quantity of air required to satisfy the biological oxygen demand of the sewage in the pressure pipe treatment line is a small fraction of that required in a conventional activated sludge treatment plant. For example, this invention requires about 10% of the air normally used in conventional activated sludge treatment plants. This saving occurs because of the greater solubility of air under pressure, air entrainment as minute bubbles, and longer contact time between the air and water interfaces due to entrapment of the air in the treatment line. These factors produce more efficient use of available oxygen in the air, or of substantially pure oxygen supplied from a reservoir of liquid oxygen.

The treated sewage at the outlet end of pressure pipe treatment line 32 comprises activated sludge and secondary effluent, or reclaimed water, which are removed from the pipeline for reuse. An advantage of the present system is its simplification of sludge disposal problems by converting all sludges to the form of activated sludge, and moving the sludge and water from a location where it is not wanted or needed to other areas where land disposal of the sludge, and distribution of the reclaimed water for use, can be accomplished more easily. Thus, the system eliminates or reduces the need for outfall facilities. Moreover, the separate cost of transporting treated waste material from the conventional sewage treatment plant to an area of reuse is eliminated.

Reclaimed water may be taken from the end of pressure pipe treatment line 32 through a line 38 and used without further treatment for forestation and other limited agricultural purposes. With these uses of the reclaimed water, it is not necessary to separate the activated sludge from the water.

Alternatively, the activated sludge and secondary effluent may be sent to a sludge removal facility 40 for separating the activated sludge from the reclaimed water. The present system permits the use of the very efficient and compact dissolved air flotation method for removing sludge. Removal by flotation is accomplished at a very low cost because of the presence of the dissolved gas already in the pressure pipe treatment line. Solids may be removed at 42 from the sludge removal facility and transported to land disposal. Alternatively, the sludge may be sent to a drying and packaging facility where it is prepared for sale as soil conditioner.

To produce effluent of secondary treatment quality in the pressure pipe treatment line, activated sludge is returned to the primary clarifier through a return line or through conventional trunk sewer collection lines (as shown in FIGS. 3 and 4), if needed to maintain sufficient activated sludge in the pressure pipe treatment system. Much of the activated sludge is microscopic in size, and therefore is easily transported with a relatively small amount of water as a carrier.

Reclaimed water may be withdrawn from the sludge removal facility 40 through a line 44 leading to a chlorination facility 46 from which the water is used for unrestricted irrigation uses.

Alternatively, the reclaimed water may be withdrawn from the sludge removal facility through a line 48 leading to a nutrient removal facility 50 where water soluble nutrients, such as nitrites, nitrates, and phosphates, are removed by anaerobic decomposition, coagulation, filtration, precipitation, or the like. The water with nutrients removed then passes through a line 52 to a chlorination facility 54 which processes the water for unrestricted recreational impoundments or unrestricted agricultural uses.

The pressure pipe treatment system of this invention substantially reduces plant construction costs by eliminating the need for secondary treatment facilities. Moreover, sludge disposal facilities can be located at the higher end of the pressure pipe where they are better located and operated in economic terms. The system also reduces treatment plant operating costs considerably because of the simplicity of operating the pressure pipe treatment system and because of its more efficient use of air. Moreover, in a conventional sewage treatment plant with ocean disposal facilities, the water resource is lost to the ocean after only one use, or an additional capital investment is required to deliver the secondary effluent from the conventional sewage treatment plant to an elevation from where it may pass through the service area for a series of secondary uses. The pressure pipe treatment and transportation system of the present invention eliminates the capital investment required for secondary treatment facilities and at the same time delivers treated water to a useful elevation for secondary uses.

EXAMPLE

Results obtained during a short-term field test of the pressure pipe treatment and transportation system are shown below:

TABLE I

| Date 24-Hr Comp | BOD* mg/l | | | | | Flow MGD*** | Air CFM+ |
|---|---|---|---|---|---|---|---|
| | Raw** | Pri. Eff. | Sta A | Sta C | Sta D | | |
| 7-10,11-69 | 111 | 63 | 34 | 24 | 10 | 0.683 | 111 |
| 7-14,15-69 | 120 | 68 | 45 | 30 | 12 | 0.726 | 58 |
| 7-17,18-69 | 144 | 82 | 67 | 28 | 9 | 0.558 | 111 |
| Average | 125 | 71 | 49 | 27 | 10 | 0,656 | |
| % Removal | | 43.2% | 61% | 78% | 92% | | |

*biological oxygen demand
**estimated
***million gallons per day
+cubic feet per minute

TABLE II

| Station | Air CFM | Dist Ft | Flow MGD | Detention Time Hrs |
|---|---|---|---|---|
| A to B | 6 | 1,650 | 0.656 | 0.16 |
| B to C | 58 | 4,200 | 0.656 | 3.02 |
| | 111 | 4,200 | 0.656 | 2.62 |
| C to D | 58 | 10,900 | 0.656 | 7.17 |
| | 111 | 10,900 | 0.656 | 5.90 |
| A to D | 58 | 16,750 | 0.656 | 10.35 |
| | 111 | 16,750 | 0.656 | 8.71 |

The above results were obtained at a conventional sewage treatment plant, which included an operating aerobic sludge digestion tank. During the test period the conventional flow pattern at the plant was altered so as to bypass the secondary portion of the plant and operate in the manner shown in FIG. 2. A mixture of primary effluent and activated sludge was delivered through a line 56 to a pumping station 58 and pumped into the lower end of an elongated upwardly inclined pressure pipe treatment line 60. The lower portion of the pressure pipe treatment line comprised a 1650 ft., 8 inch diameter, asbestos cement force-main 62. An air compressor 64 injected six CFM of air into the lower end of force-main 62 at a station A at about 85 P.S.I.G. Sewage travelling through force-main 62 was discharged into a second asbestos cement force-main 66 having a length of 15,100 feet and a 24 inch diameter. Air was injected into the lower end of force-main 66 at a station B by an air compressor 68 at about 80 p.s.i.g. Sewage was pumped into the pressure pipe treatment line at station A at an elevation of 10 feet, and after travelling through the pipeline it was discharged as secondary effluent and activated sludge into a reservoir 70 at elevation of 200 feet. The pressure pipe treatment line was not laid on a uniform upward grade. It contained two inverted siphons, each having depressions of more than 10 feet. Test samples of the sewage travelling through the pipeline were taken at stations A and B, at a station C at an intermediate location along force-main 66, and at a station D at the end of force-main 66. As shown in Table II above, test results were obtained by operating each air compressor 68 at both 58 CFM and 111 CFM.

No significant hydraulic problems materialized as a result of the air injection and the siphons. No detectable difference in pumping head was experienced with or without air injection. The only apparent hydraulic effect of the air in the pipeline was surging within a range of 15 lbs. when effluent pumps 58 were started and stopped.

The biological oxygen demand of the raw sewage entering the sewage treatment plant was considerably lower than that expected at most plants due to a significant amount of groundwater intrusion at that time into the collection system and into the treatment plant structures. In spite of the presence of groundwater, Table I above shows an average biological oxygen demand removal of 90% when measured as a percentage of removal from the raw sewage, and an 86% removal when measured as a percent removal from the primary effluent. It would be reasonable to expect that percentage removals would be higher if the pressure pipe treatment system were used on primary effluent containing higher biological oxygen demand values.

The pressure pipe treatment system of the present invention makes it possible to realize a substantial savings in trunk sewer line capacity requirements by intercepting the water portion of sewage flow at upstream points in the trunk sewer system and pumping this flow directly into the pressure pipe treatment and transportation line. This advantage may be understood best by referring to FIG. 3 which shows schematically a series of trunk sewers 72 which collect raw sewage and transport it in a generally downhill direction to a pressure pipe treatment headworks plant 74 where the sewage is passed through a primary clarifier, such as a screen with an aerobic sludge activator located in the manner shown in FIG. 1. Activated sludge and effluent from the primary clarifier is delivered to the lower end of a pressure pipe treatment line 75. Air or pure oxygen is injected into the high pressure area of pipeline 75 by suitable means (not shown), as described above.

Several longitudinally spaced solids separators 76 intercept part of the liquid portion of the raw sewage at spaced locations in the higher part of the trunk sewer system. Solids are separated with about 25% of the water from the sewage and sent down to the headworks 74 through trunk sewer lines 72 for processing. The other 75% of the water is pumped directly into the pressure pipe treatment line at longitudinally spaced locations through lateral sewer discharge lines 78. Because of the removal of the water, downstream trunk sewers need only about 25% as much capacity as in conventional systems, and the pressure pipe treatment headworks needs only about 25% as much hydraulic capacity as a headworks in conventional systems. The system also reduces the capacity requirements in the lower portion of pressure pipe treatment line 75. As shown in FIG. 3, the lower portion of the treatment line has a reduced capacity, with the capacity being increased as waste water is added to the upper portions of the line through lateral sewer lines 78. If necessary, additional air or oxygen is introduced to the pressure pipe treatment line at longitudinally spaced locations. Effluent from the discharge end of the pressure pipe treatment line is delivered to a sludge removal station 79 where sludge is removed, by flotation, or other suitable means. Part of the sludge is delivered to an aerobic sludge activator 80 which is supplied oxygen or air to condition the aerated sludge for return through the trunk sewer line 72 to the headworks. The returned activated sludge provides some "pre-treatment" to the raw sewage on its way to the headworks, and maintains the required amount of activated sludge in the system. The excess sludge from the sludge removal stage 79 is used as a soil conditioner.

If primary sewage solids are converted to activated sludge before being delivered to the primary treatment plant, a major odor control problem is solved. FIG. 4 shows an alternative embodiment of the pressure pipe treatment system of this invention in which sewage arrives at the primary treatment plant in an odor-free condition. Raw sewage entering a pump station and headworks 81 is pumped into the lower end of a pressure pipe treatment line 82 which is similar in construction to those described above. An air compressor 84 injects air under pressure into the high pressure area at the lower end of pressure pipe treatment line 82. As the sewage travels up the pressure pipe treatment line, it is converted to substantially completely treated water and activated sludge which arrive at a solids separation plant 86 at the upper end of pressure pipe treatment line 82.

Solids separation facility 86 may include any one of several different types of solids separation systems, such as a dissolved air flotator, a settling tank, filters, screens, or the like. If a flotator is used, the solids are removed from the top of the unit. If a settling tank (not shown) is used, it has a sump (not shown) at its bottom from which treated activated sludge is withdrawn. Substantially completely treated activated sludge is withdrawn from the solids separator facility through a return line 92 (which may be a sewer trunk line) leading to a wet well (not shown) at pumping station 80 where the treated activated sludge is blended with incoming raw sewage, if it has not been done in the trunk sewer. The treated activated sludge and the injected oxygen substantially eliminate the biological oxygen demand of the solids in the sewage pumped into the lower end of pressure pipe treatment line 82. By the time the sewage arrives at solids separator facility 86 it is in a substantially odor-free condition.

Excess quantities of the treated activated sludge from the solids separation facility may be disposed of by incineration or used for agricultural purposes.

Water from the secondary treatment facility is pumped to a holding point 92 and thereafter is treated by chlorination at 94 to produce water which may be reused for agricultural purposes, or sent elsewhere for further treatment.

FIG. 5 shows the invention used to treat sewage which becomes nitrified and which requires denitrification. Raw sewage enters through a line 96 into a pump station and headworks 97, which delivers the sewage to a pressure pipe treatment line 98. Oxygen is introduced through a line 99 into the inlet end of the pressure pipe treatment line so that the sewage is treated as described with respect to FIGS. 1–4.

Treated sewage from the discharge end of the pressure pipe treatment line enters a first sludge removal stage 100 where some activated sludge is taken off through sludge discharge line 101. A portion of the removed activated sludge is returned through a line 102 to the pump station and headworks for recirculation through the pressure pipe treatment line. A valve 103 in line 102 controls the amount of activated sludge returned to the pump station and headworks. The return line 102 can be a trunk sewer line as described above. The remainder of the removed sludge is delivered through a line 104 and a control valve 105 to a landfill area 106.

By the time the treated sewage reaches the first sludge removal stage, the BOD of the sewage is substantially satisfied, and virtually all of the dissolved oxygen has been consumed. Effluent from the first sludge removal stage is passed through a line 107 to a second sludge removal stage 108. The effluent leaving the first sludge removal stage is at or near an anaerobic condition. If necessary, methyl alcohol is added from a supply 109 to the inlet of line 107 to insure that any oxygen remaining in the liquid is consumed, and to provide nutrient and carbon for cell building by denitrifying bacteria, which are returned from the second sludge removal stage through a line 112 to the inlet of line 107. Ordinarily, the water and sludge from the second stage 108 contain enough facultative bacteria for denitrification of the sewage. If needed, the facultative bacteria can be added to line 107 from an exterior source to get the reaction started. Examples of such bacteria are *pseudomonas, achromobacter,* and *bacillus.*

The amount of methyl alcohol added is usually 2 to 5 times the amount nitrogen compounds present, in terms of nitrate or nitrite. Other materials which may be used in place of methyl alcohol are glucose, ethyl alcohol, acetic acid, and acetone. However, methyl alcohol is preferred because of its lower unit cost.

Since no dissolved oxygen is available in line 107, the denitrifying bacteria consume oxygen from the nitrate and nitrite compounds, releasing nitrogen gas in the pipeline as the effluent is transported to storage for reuse. Sludge separation and nitrogen gas discharge are effected at the second sludge removal stage 108. A major portion of the sludge and bacteria removed at the second stage are returned through line 112 to the inlet of pipe 107. A control valve 113 in line 112 controls the rate of sludge and bacteria recirculation in the line 107. The remaining sludge is discharged through line 114 and a control valve 115 to the landfill area 106. Denitrified liquid from the second sludge removal stage is passed through a reservoir 116 for further use.

The pressure pipe treatment system provided by this invention not only treats and transports the sewage effluent simultaneously, but it also makes possible a substantial saving in initial capital investment for plant equipment, as well as continued operating costs. For example, a typical conventional sewage plant designed to handle about 35,000,000 gallons per day of raw sewage would cost about $25,000,000. A plant of the same capacity using the pressure pipe treatment system can be built for less than $15,000,000., resulting in a saving of about 40% of the capital cost of the conventional plant.

I claim:

1. A system for simultaneously treating and transporting raw liquid waste material from a point of collection to a location where treated effluent from the raw waste material can be economically used, the system comprising an elongated pressure pipe treatment line having an inlet end and an outlet end, the pressure pipe treatment line being inclined upwardly toward its outlet end so the static head of the waste material in the pressure pipe treatment line due to the difference in elevation between the inlet and outlet of the pressure pipe treatment line is at least several atmospheres; a pump having an inlet to receive raw waste and an outlet connected to the pressure pipe treatment line inlet for delivering the raw waste material under a pressure of at least several times atmospheric to the inlet end of the pressure pipe treatment line and producing a sufficiently high pressure at the inlet end of the pressure pipe treatment line to force the raw waste material toward the outlet end of the pressure pipe treatment line; means for injecting oxygen under a pressure of at least several atmospheres into the raw waste material at the high pressure end of the pressure pipe treatment line so the oxygen substantially reduces the biological oxygen demand of the raw waste material; and means at the outlet end of the pressure pipe treatment line for withdrawing the treated waste material.

2. The system according to claim 1 which includes means for mixing activated sludge with the raw waste material, and means for delivering the mixture to the pump inlet.

3. The system according to claim 1 which includes an effluent headworks connected to the inlet side of the pump, a downwardly inclined trunk sewer pipe connected for collecting and delivering a stream of waste water and sewage solids to the headworks, the trunk sewer pipe having an inlet and an outlet, separator means in the trunk sewer pipe between its inlet and outlet for separating a portion of the waste water from the stream, and means for delivering the separated portion of the waste water to the interior of the pressure pipe treatment line at a point downstream from the inlet end of the pressure pipe treatment line, and permitting the remainder of the waste water to flow from the said means toward the outlet of the trunk sewer pipe.

4. A method of treating raw waste material in an elongated pressure pipe treatment line having an inlet end and an outlet end, the method comprising the steps of delivering the raw waste material to the inlet end of the pressure pipe treatment line under at least several times atmospheric pressure and producing a sufficiently high pressure at the inlet end to force the waste material toward the outlet end of the pressure pipe treatment line; injecting sufficient oxygen into the raw waste material in the pressure pipe treatment line where the pressure is at least several atmospheres to reduce substantially the biological oxygen demand of the raw waste material; creating an anaerobic condition in the waste material in the pressure pipe treatment line where there has been a substantial biological oxygen demand reduction and nitrification of the waste material; thereafter maintaining the anaerobic condition of the waste material to cause nitrogen to be removed from the waste material and released as nitrogen gas; and withdrawing the treated waste material from the pressure pipe treatment line outlet.

5. The method according to claim 4 which includes adding to the waste material a nutrient for bacteria which consume oxygen and release nitrogen from nitrified waste material.

6. The method according to claim 4 which includes adding to the waste material bacteria which consume oxygen and release nitrogen from nitrified waste material.

7. A method of delivering raw waste material from a downwardly extending trunk sewer pipe to a sewage treatment plant at the lower end of an upwardly inclined elongated pressure pipe treatment line for treatment of the raw waste material, the raw waste material including waste water and raw sewage solids, the method comprising the steps of removing a portion of the waste water from the raw waste material at a point upstream of the lower end of the trunk sewer pipe; delivering the remaining waste water and the raw sewage solids via the trunk sewer to the headworks; converting at least a portion of the raw sewage solids to activated sludge; delivering the activated sludge and the remaining waste water to the lower end of the pressure pipe treatment line at a sufficiently high pressure to force the activated sludge and waste water up the pressure pipe treatment line; injecting the removed portion of the waste water into the activated sludge and waste water flowing up the pressure pipe treatment line at a point spaced from the lower end of the pressure pipe treatment line; injecting a sufficient amount of oxygen under pressure into the activated sludge and waste water in the pressure pipe treatment line such that the oxygen substantially reduces the biological oxygen demand of the waste material in the pressure pipe treatment line; and withdrawing the treated waste material from the upper end of the pressure pipe treatment line.

8. The method according to claim 7 which includes the steps of maintaining a pressure of at least several atmospheres at the inlet end of the pressure pipe treatment line, supplying a mixture of waste material and activated sludge to the inlet of the pressure pipe treatment system, and injecting oxygen into the pressure pipe treatment line.

9. The method according to claim 7 including removing a portion of the waste water from the raw waste material in the trunk sewer pipe at several spaced apart locations; and delivering the removed portions of the waste water from each point of separation to a separate point in the pressure pipe treatment line downstream of the lower end of the pressure pipe treatment line.

10. The method according to claim 9 including injecting oxygen into the pressure pipe treatment line at longitudinally spaced apart locations along the pressure pipe treatment line.

11. The method according to claim 7 which includes removing some activated sludge from the pressure pipe treatment line, and introducing the removed sludge into the trunk sewer pipe for return to the inlet end of the pressure pipe treatment line.

12. The method according to claim 7 which includes creating an anaerobic condition in the waste material in the pressure pipe treatment line where there has been a substantial biological oxygen demand reduction and nitrification of the waste material, and thereafter maintaining the anaerobic condition of the waste material to cause nitrogen to be removed from the waste material and released as nitrogen gas.

13. Apparatus for collecting, treating, and transporting a raw sewage mixture of water and organic waste to a reservoir, the apparatus including a pump having an inlet and an outlet, a trunk sewer collection pipe extending from sewage collection areas to the pump, means for delivering raw sewage from the trunk sewer pipe to the pump inlet, a pressure pipe treatment line having an inlet and an outlet, means connecting the pump outlet to the pressure pipe treatment line inlet, means for injecting oxygen into the pressure pipe treatment line at a pressure of at least several times atmospheric so the oxygen substantially reduces the biological oxygen demand of the raw sewage and produces a mixture of water and activated sludge in the pressure pipe treatment line, means for removing at least some of the activated sludge from the pressure pipe treatment line, means for delivering at least part of the removed activated sludge to the trunk sewer pipe for return to the pump, and means for delivering water from the pressure pipe treatment line outlet to the reservoir.

14. Apparatus for collecting, treating, and transporting a raw sewage mixture of water and organic waste to a reservoir, the apparatus including a pump having an inlet and an outlet, a trunk sewer collection pipe extending downwardly from sewage collection areas to the pump, means for delivering raw sewage from the trunk sewer pipe to the pump inlet, a pressure pipe treatment line extending upwardly from an inlet and an outlet, means connecting the pump outlet to the pressure pipe treatment line inlet, means for injecting oxygen into the pressure pipe treatment line so the oxygen substantially reduces the biological oxygen demand of the raw sewage and produces a mixture of water and activated sludge in the pressure pipe treatment line, means for removing a substantial portion of the water from the sewage mixture in the trunk sewer pipe at a location spaced from the pump, means for delivering water removed from the trunk sewer pipe to the pressure pipe treatment line at a location spaced from the pump, and means for delivering water from the pressure pipe treatment line outlet to the reservoir.

15. Apparatus according to claim 14 which includes a plurality of means at longitudinally spaced locations along the trunk sewer pipe for removing water from the sewage mixture.

16. Apparatus according to claim 14 which includes a plurality of means for delivering water removed from the trunk sewer pipe to the pressure pipe treatment line at a plurality of longitudinally spaced locations along the line.

17. Apparatus according to claim 14 in which the hydraulic capacity of the pressure pipe treatment line increases in the direction of liquid flow through the line.

* * * * *